United States Patent

Takeuchi

Patent Number: 5,984,402
Date of Patent: Nov. 16, 1999

[54] SIDEBODY STRUCTURE OF MOTOR VEHICLE

[75] Inventor: Akihide Takeuchi, Sawa, Japan

[73] Assignee: Fuji Jukogyo Kabushiki Kaisha, Tokyo, Japan

[21] Appl. No.: 08/802,799

[22] Filed: Feb. 18, 1997

[30] Foreign Application Priority Data

Mar. 19, 1996 [JP] Japan .................................. 8-090007

[51] Int. Cl.$^6$ .................................................. B62D 25/02
[52] U.S. Cl. ........................ 296/188; 296/189; 296/209; 296/30
[58] Field of Search .............................. 296/203.03, 209, 296/29, 30, 188, 189; 280/784

[56] References Cited

U.S. PATENT DOCUMENTS

| | | | |
|---|---|---|---|
| 4,938,525 | 7/1990 | Yamauchi | 296/188 X |
| 5,242,209 | 9/1993 | Yamauchi | 296/188 |
| 5,246,264 | 9/1993 | Yoshii | 296/209 X |
| 5,370,438 | 12/1994 | Mori et al. | 296/209 X |
| 5,388,885 | 2/1995 | Warren | 296/209 X |
| 5,613,727 | 3/1997 | Yamazaki | 296/209 X |
| 5,671,968 | 9/1997 | Masuda et al. | 296/203.03 X |

FOREIGN PATENT DOCUMENTS 0 753 450 A1  1/1997  European Pat. Off. .

Primary Examiner—D. Glenn Dayoan
Assistant Examiner—Chad D. Wells
Attorney, Agent, or Firm—Smith, Gambrell & Russell, LLP

[57] ABSTRACT

A sidebody structure of a motor vehicle includes a pillar reinforcement member provided in a center pillar so that center pillar has a substantially strong structure against a bending moment when a side impact load is applied thereto. A first yieldable portion is provided at the connecting portion of the center pillar and a side rail so that the center pillar is bent inwardly at the first yieldable portion when a side impact load is applied to the center pillar, and a second yieldable portion is provided at the second connecting portion of the center pillar and a side sill so that the side sill is deformed inwardly at the second yieldable portion, being pushed by the incoming center pillar. Thus, in an event of a side collision, a passenger's seat swings inwardly around the connecting portion of the center pillar and the side rail like a pendulum, coordinating with the movement of the center pillar, whereby a passenger can avoid being struck by the incoming center pillar.

2 Claims, 6 Drawing Sheets

MOVING BARRIER

GROUND LINE

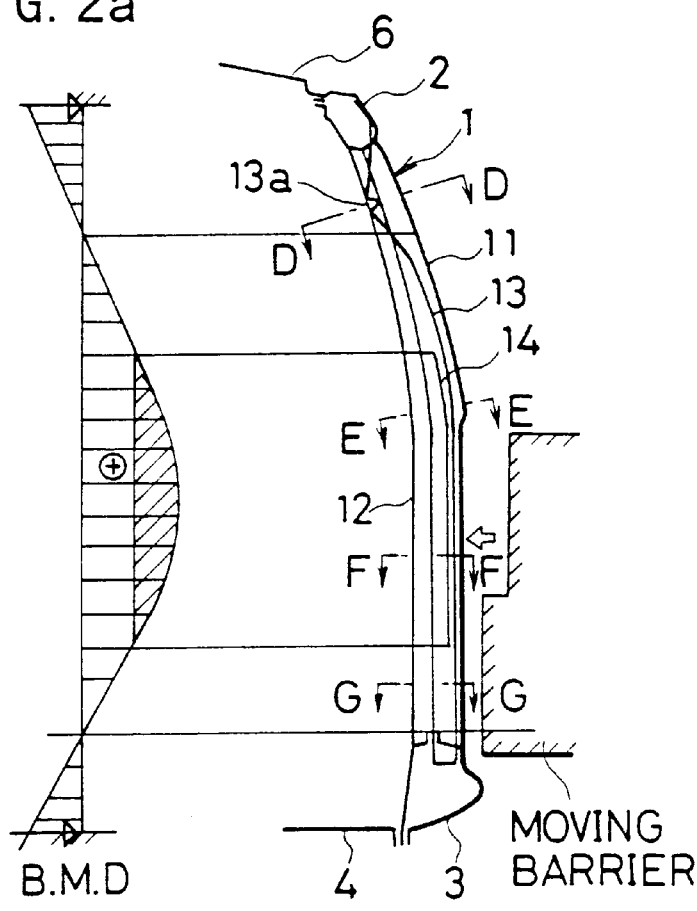
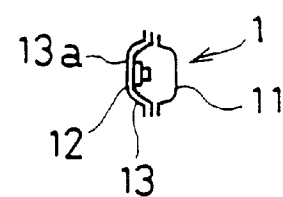
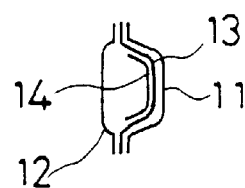
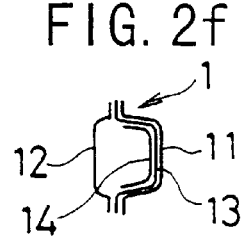
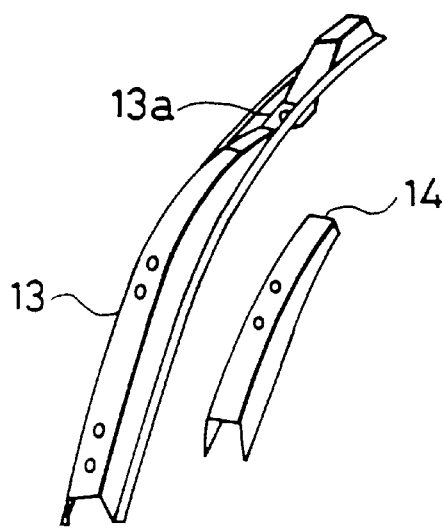
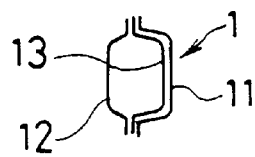

OVERLAPPED PORTION

SIDEBODY STRUCTURE OF MOTOR VEHICLE

BACKGROUND OF THE INVENTION

1. Field of the Invention

The present invention relates to a sidebody structure of a motor vehicle and more particularly to a center pillar structure capable of minimizing damage which passengers may suffers in the event of a side collision.

2. Prior Art

It is well known that a reinforced center pillar or side door is effective for protecting passengers when a side impact is applied to the vehicle in a direction widthwise thereof. Japanese Unexamined Utility Model Publication Laid-open No. Jitsu-Kai-Hei 4-81887 discloses one approach to increase the strength and rigidity of the center pillar by inserting reinforcement members therein so as to reduce the amount of deformation of the center pillar, thereby protecting occupants in an event of a side collision.

This approach of strengthening the sidebody structure like a center pillar or a side door is effective in a vehicle having a relatively large size and heavy weight. In the case of a vehicle of a relatively small size, since such vehicle is not allowed to secure enough space between occupants and its sidebody structure, the approach of raising strength of the sidebody structure, which needs some degree of weight for reinforcing members, spoils such advantages of small cars as light weight, low manufacturing cost and the like, when comparing the effect of the approach with an increased weight.

Therefore, in the case of a small car, it is necessary to introoduce a different approach from the aforementioned one. An example of the approach taken in the present invention is to protect passengers by constituting the sidebody structure in such a way that the center pillar swings like a pendulum inwardly around a connecting portion thereof with the side rail when a side impact is applied (i.e., the center pillar pivots about a pivot point). Then, at the same time, the passenger seat swings like a pendulum inwardly, and thereby the passenger is prevented from being hit by the incoming center pillar.

SUMMARY OF THE INVENTION

More specifically, the sidebody structure according to the present invention is constituted by a pillar reinforcement member provided in a center pillar so that the center pillar has a substantially strong structure against a bending moment when a side impact load is applied thereto, a first yieldable portion provided at the connecting portion of the center pillar and the side rail so that the center pillar is bent inwardly at the first yieldable portion when a side impact load is applied to the center pillar, and a second yieldable portion provided at the second connecting portion of the center pillar and the side sill so that the side sill is deformed inwardly at the second yieldable portion, being pushed by the incoming center pillar, when a side impact load is applied to the center pillar.

DESCRIPTION OF THE DRAWINGS

FIG. 2a is a moment diagram of a center pillar when a side impact is applied thereto;

FIG. 2b is a transverse sectional view of a center pillar;

FIG. 2c is a perspective view of a pillar reinforcement member;

FIG. 2d is a cross sectional view taken along the line D—D in FIG. 2b;

FIG. 2e is a cross sectional view taken along the line E—E in FIG. 2b;

FIG. 2f is a cross sectional view taken along the line F—F in FIG. 2b;

FIG. 2g is a cross sectional view taken along the line G—G in FIG. 2b;

FIG. 3b is a cross sectional view taken along the line B—B in FIG. 3a;

FIG. 3c is a cross sectional view taken along the line C—C in FIG. 3a;

FIG. 3d is a cross sectional view taken along the line D—D in FIG. 3a;

FIG. 4b is a cross sectional view taken along the line B—B in FIG. 4a;

FIG. 6b is a cross sectional view taken along the line B—B in FIG. 6a;

FIG. 6c is a cross sectional view taken along the line C—C in FIG. 6a;

FIG. 6d is a cross sectional view taken along the line D—D in FIG. 6a;

DETAILED DESCRIPTION OF PREFERRED EMBODIMENTS

Figure 1A:
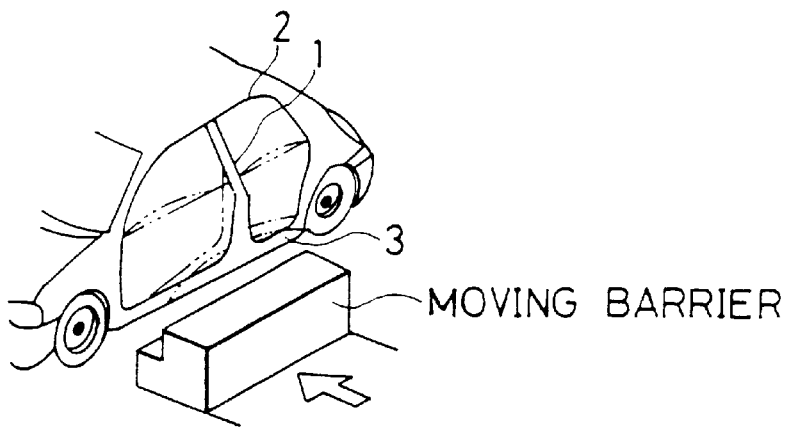
FIG. 1a is a perspective view showing a procedure for side impact testing.
Figure 1B:
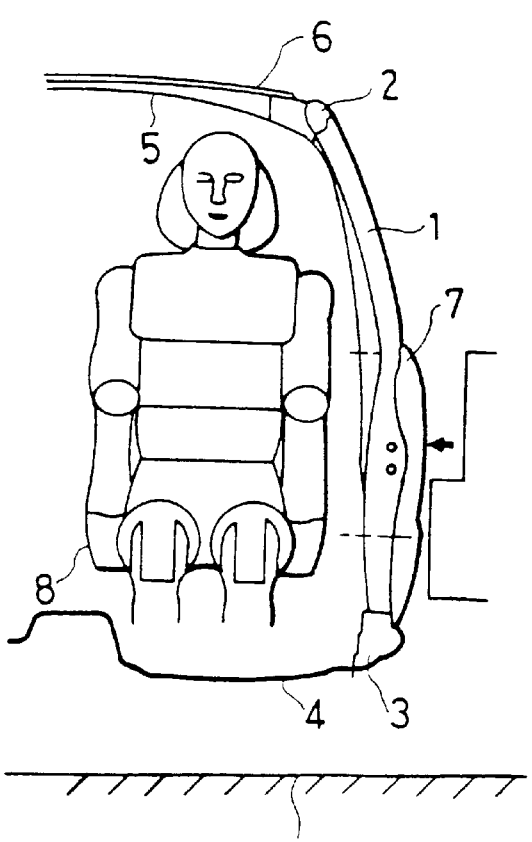
FIG. 1b is a transverse sectional view showing a positional relationship before impact between a passenger and a sidebody structure according to a first embodiment of the present invention.
Figure 1C:
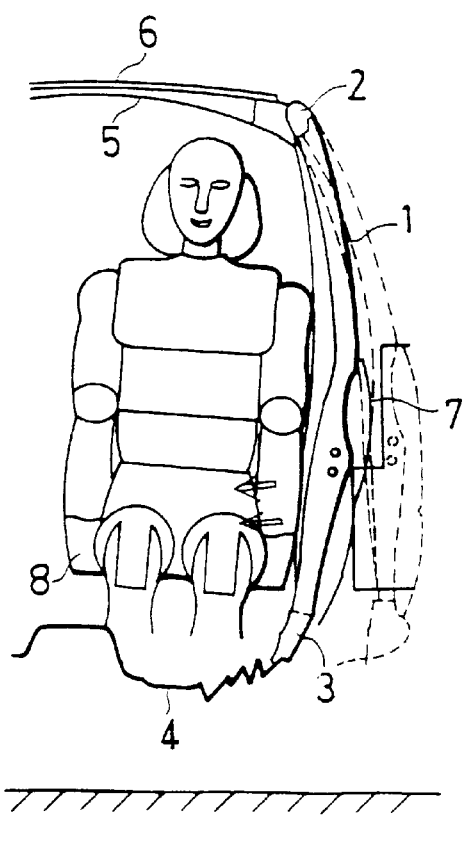
FIG. 1c is a transverse sectional view showing a positional relationship after impact between a passenger and a sidebody structure according to a first embodiment of the present invention.
Figure 3A:
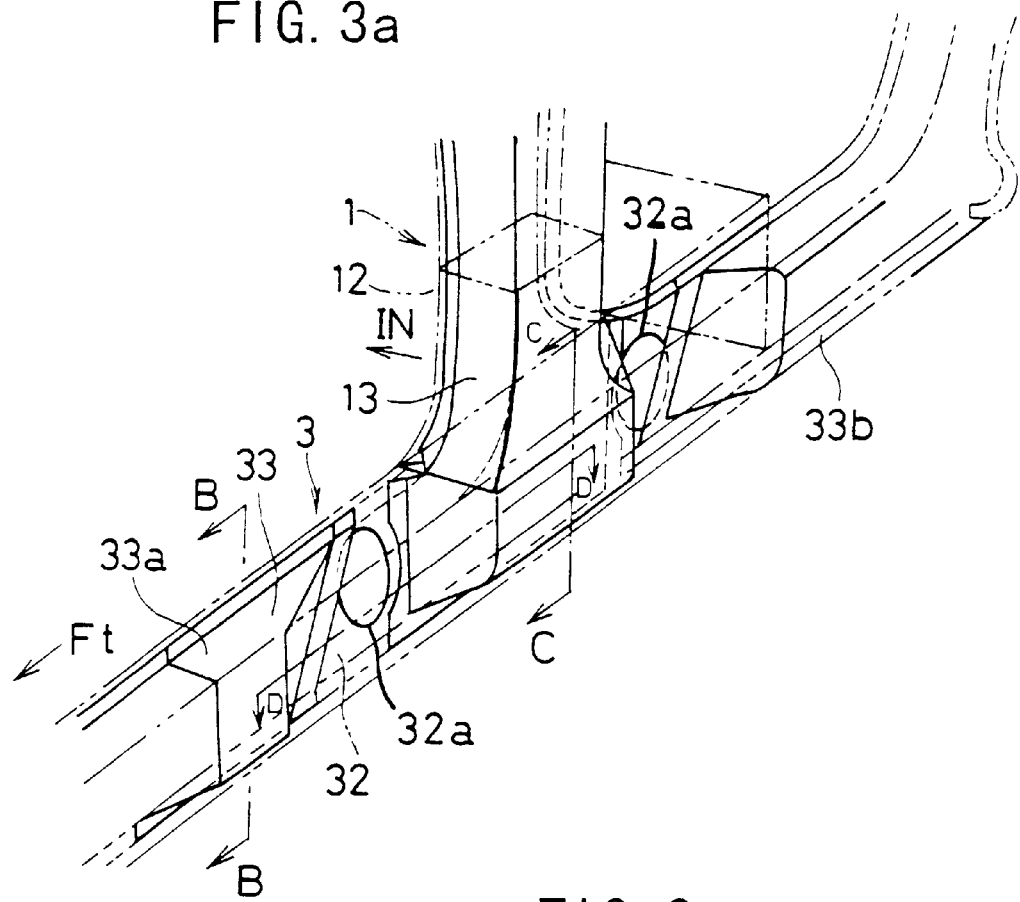
FIG. 3a is a perspective view showing an example of a connecting structure of a center pillar with a side sill at the lower end thereof.
Figure 3B:
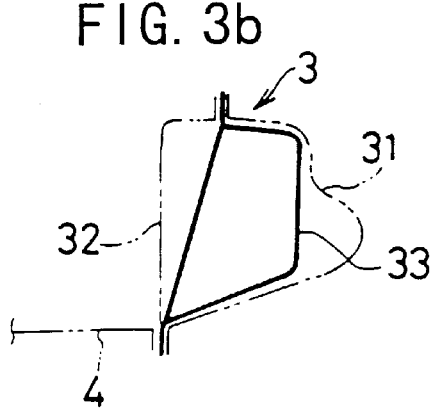
Figure 3C:
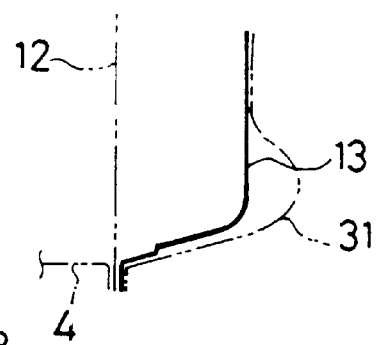
Figure 3D:
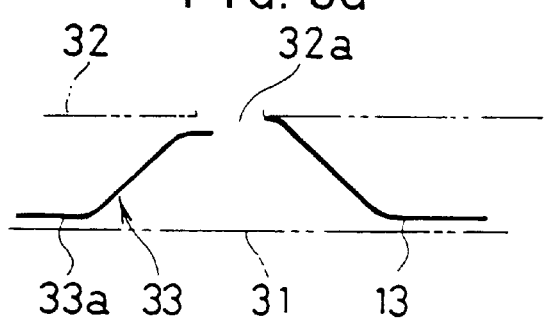

Referring now to FIG. 1a through 1c, numeral 1 denotes a center pillar, numeral 2 denotes a side rail, numeral 3 denotes a side sill, numeral 5 denotes a roof brace, and numeral 6 denotes a roof panel. The center pillar 1 is connected at the upper end thereof with the side rail 2 and is connected at the lower end thereof with the side sill 3. The floor panel 4 is connected at the side edge thereof with the side sill 3. The roof panel 6 is connected at the under surface thereof with the roof brace 5 and further is connected at the side edge thereof with the side rail 2. Numeral 7 indicates a side door. The center pillar 1 comprises a hollow member formed by an outer pillar 11 and an inner pillar 12 and a pillar reinforcement member provided therein. See, for example, FIGS. 2b and 2d through 2g.

FIG. 2a illustrates a moment diagram of the center pillar 1 when an impact is given to the sidebody structure by a moving barrier. According to this moment diagram, it is understood that a middle portion of the center pillar 1, showing a maximum moment distribution, needs to be reinforced by a first pillar reinforcement member 13 and a second pillar reinforcement member 14 as shown in FIGS. 2b, 2c, 2e, 2f and 2g. Specifically, the first pillar reinforcement member 13 is provided along the inner surface of the outer pillar 11, extending from the lower end of the center pillar 1 to the upper end thereof. A shoulder belt anchorage 13a is formed at a partially convexed portion provided at a minimum bending moment in the center pillar 1.

Further, the second pillar reinforcement member 14 is rigidly connected to the inner face of the first pillar reinforcement 13 so as to reinforce the intermediate portion at a large bending moment in the center pillar 1. That portion is located at approximately the same level as a window shoulder.

As shown in FIG. 2c, the second pillar reinforcement member 14 is inserted from behind and connected to the first pillar reinforcement member 13 by spot welding. Further, the pillar reinforcement member 13 is connected by spot welding to the outer pillar 11 and the inner pillar 12 at flanges thereof. Thus, the center pillar 1 is reinforced by the first and second reinforcement members 13 and 14 at the portion where the largest bending moment is found.

The connecting portion of the center pillar 1 with the side sill 3 is constituted so that the side sill 3 is bent toward the inside of the vehicle body by the lower end of the center pillar being pushed inwardly when a side impact load is applied to the center pillar 1.

Describing an example of a specific structure with reference to FIGS. 3a through 3d, although generally the side sill 3 comprises a hollow member formed by an outer side sill 31 and an inner side sill 32 and a side sill reinforcement member 33 longitudinally inserted in this hollow member, in this embodiment the side sill reinforcement member 33 is separated into two portions, a front side sill reinforcement 33a provided on the front side of the side sill 3 and a rear side sill reinforcement 33b provided on the rear side thereof. Thus, a strength discontinuity portion lacking the side sill reinforcement member 33 is formed at the connecting point of the center pillar 1 and the side sill 3. That discontinuity portion extends a certain range in a forward and backward direction of the side sill 3 with that connecting portion at the center. At the middle of the strength discontinuity portion with respect to its lengthwise direction, the first pillar reinforcement member 13 of the center pillar 1 is rigidly connected to the inner side sill 32. Further, a hole 32a (a work hole to facilitate spot welding as well as for adding rust preventives therethrough, is provided in the inner side sill 32 at the strength discontinuity portion so as to allow the side sill 3 to easily bend in an inner direction at that strength discontinuity portion. The lower ends of the outer pillar 11 and the inner pillar 12 are rigidly connected with the outer side sill 31 and the inner side sill 32 respectively.

The center pillar 1 is connected at the upper end thereof with the side rail 2, and the connecting portion of the center pillar 1 with the side rail 2 acts as a rotational center (or pivot point) when the lower portion of the center pillar 1 rotates (or pivots) inwardly in the event of a side impact.

Figure 4A:
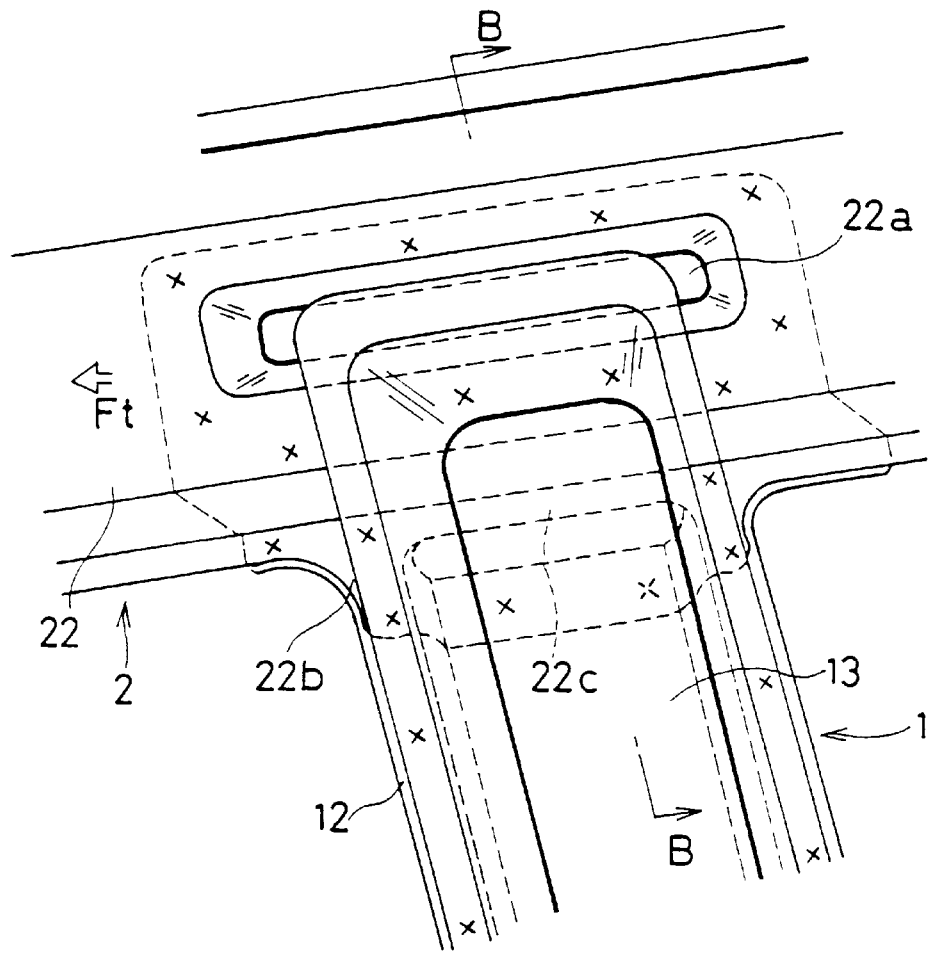
FIG. 4a is a perspective view showing an example of a connecting structure of a center pillar with a side rail at the upper end thereof.
Figure 4B:
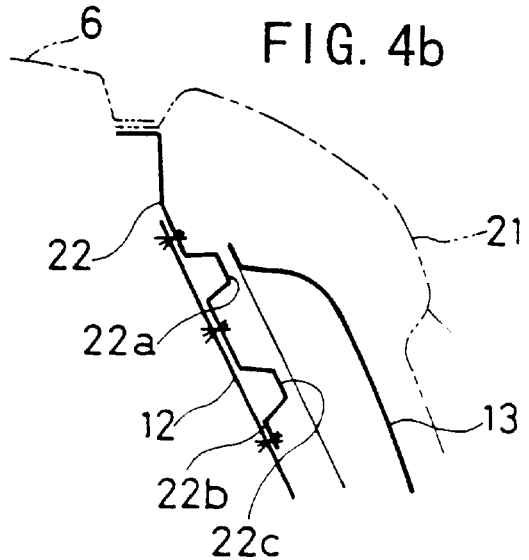

Describing more specifically an example of the above connecting structure with reference to FIGS. 4a and 4b, the side rail 2 comprises an outer side rail 21 and an inner side rail 22 and is connected with the upper end of the center pillar 1. On the outer side of the inner side rail 22, there is provided a first bead portion 22a convexed outwardly and formed in a longitudinal direction of the vehicle. Also, a second bead portion 22c is provided on the outer side of the rail 22 below the first bead portion 22a in parallel therewith. The inner pillar 12 has a T-shaped end which is connected by spot-welding at the first bead portion 22a and the second bead portion 22c with the inner side rail 22, forming two box shaped cross sections in parallel with each other. Thus, the connecting portion of the side rail 2 and the center pillar 1 has a strong resistance against force applied from the outside.

The first pillar reinforcement member 13 is connected by spot welding at the flange thereof with the connecting surface 22b of the inner pillar 12, but it is not connected with the side rail 2 anywhere. As shown in FIG. 4b, the first pillar reinforcement member 13 is opposed to the first and second bead portions 22a and 22c with small gaps. Therefore, when an impact load is applied to the center pillar 1 in the inward direction of the vehicle, the first pillar reinforcement member 13 is contacted at the top end thereof with the first bead portion 22a, and next it is contacted with both sides of the second bead portion 22c. However, since these two bead portions 22a and 22c have strong resistance against deformation, the center pillar 1 rotates or pivots inwardly around the connecting portion of the center pillar 1 and the side rail 2.

Since the center pillar 1 is reinforced effectively so as to meet the moment distribution, the side impact load is inputted to the inner side sill 32 of the side sill 3 through the lower end of the first pillar reinforcement member 13. When a side impact is applied to the sidebody structure of the vehicle, since the connecting portion of the center pillar 1 and the side sill 3 has a discontinuity portion that is easily deformed, the side sill 3 moves in the inward direction of the vehicle, while the floor panel 4 buckles in a manner shown in FIG. 1c, and at the same time the center pillar 1 swings or pivots like a pendulum inwardly around the connecting portion of the center pillar 1 and the side rail 2 (i.e., about a pivot point) without giving any deformation to the center pillar itself. Thus, the impact energy is absorbed by the deformation of the side sill 3 and the buckling of the floor panel 4.

When a side collision is applied to the sidebody, first the side sill 3 is bent at the aforementioned strength discontinuity portion and then the center pillar 1 rotates or pivots like a pendulum around the connecting portion of the center pillar 1 and the side rail 2 (i.e., about a pivot point). Next, the lower portions of the center pillar 1 and the side door 7 moves toward the center of the vehicle. Correspondingly to this movement, the seat 8 and the passenger seated thereon are pushed inside like a pendulum in a manner shown in FIG. 1c. As a result of these overall movements, when a side impact is applied to the sidebody of the vehicle, the passenger can prevent his or her chest or head from being hit by the incoming center pillar. In order to ensure this movement, for example, such a structure as described below may be introduced.

The center pillar 1 is connected at the lower end thereof with a girder (not shown) provided transversely toward the center of the vehicle. The girder, having seat anchorages (not shown) for anchoring the seat 8, is constituted so that it slides in the center direction of the vehicle on the floor panel 4 together with the seat 8, when the center pillar 1 is pushed inside in the event of a side collision. In lieu of the girder, a known cross member for transversely connecting the left and right side sills may be used.

Figure 5:
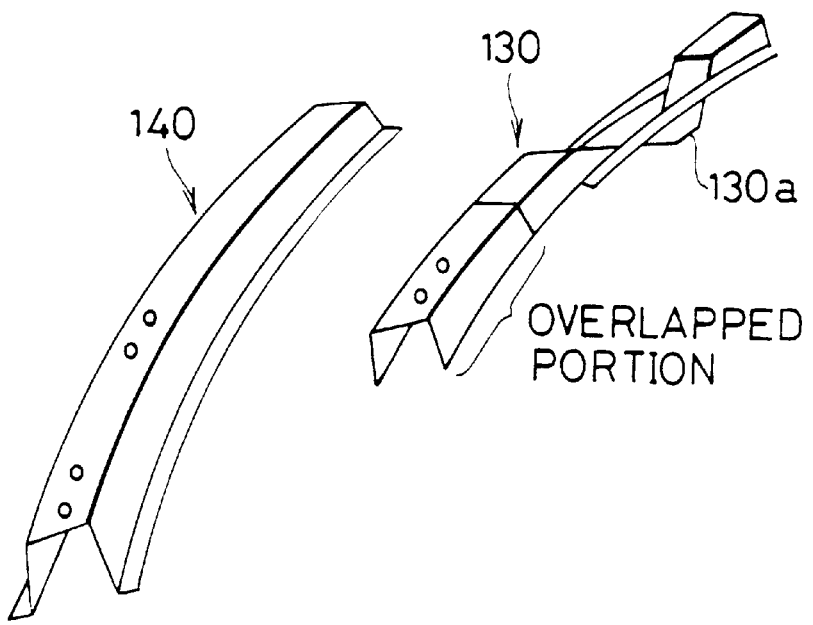
FIG. 5 is a perspective view of another example of a pillar reinforcement member.

FIG. 5 shows an example of the reinforcing means of the center pillar 1. In the aforementioned example, in order to reinforce the portion having the largest bending moment, the center pillar 1 is reinforced by the first pillar reinforcement member 13 and the second pillar reinforcement member 14 for further partially reinforcing the center pillar 1. In the example shown in FIG. 5, the pillar reinforcement is divided into two portions, an upper pillar reinforcement member 130 and a lower pillar reinforcement member 140, and these two portions are rigidly connected with each other at the portion having the large bending moment. It is needless to say that the overlapping portion of these reinforcement members is adjusted to the portion having the largest bending moment. In this case, the shoulder belt anchorage 130a is provided at the portion of the upper pillar reinforcement member 130 where the smallest bending moment is found.

Figure 6A:
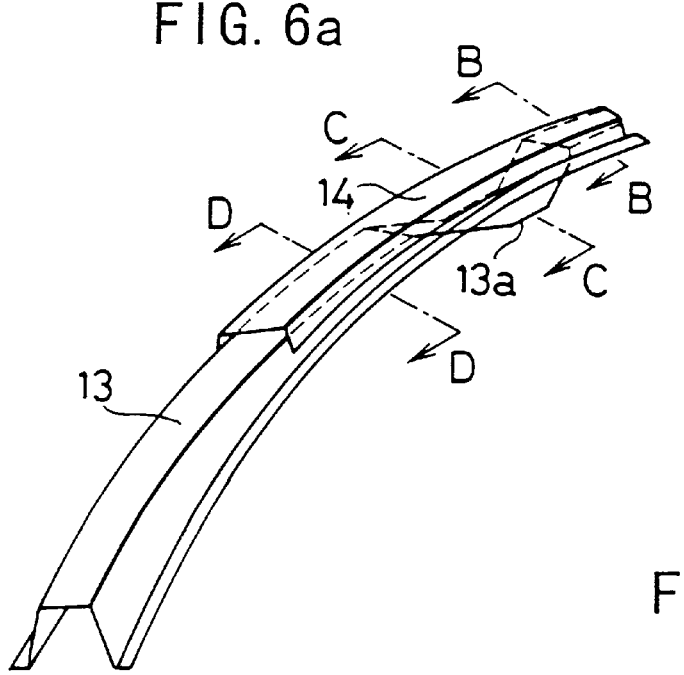
FIG. 6a is a perspective view of another example of a pillar reinforcement.
Figure 6B:
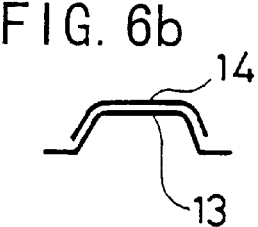
Figure 6C:
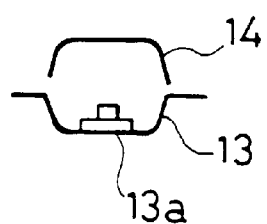
Figure 6D:
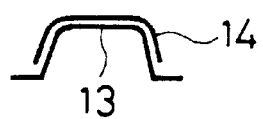

FIGS. 6a through 6d show another example of the reinforcing means of the center pillar 1 in the case where the moment distribution is different from that of the case shown in FIG. 2a. In this case, since a large moment appears at a position higher than the window shoulder point in the center pillar 1, reinforcement is applied focused on that area. That is, as shown in FIG. 6a, the first pillar reinforcement member 13 extends from the bottom to the top of the center pillar 1 and the second pillar reinforcement member 14 is rigidly connected with the first pillar reinforcement member 13 from outside over the full length thereof. The shoulder belt anchorage 13a is included in this overlapping area of the first pillar reinforcement member 13.

Figure 7A:
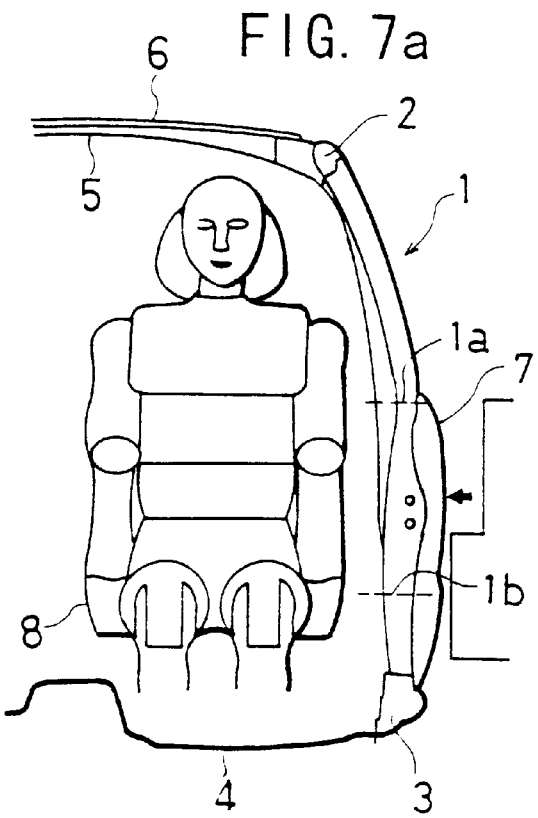
FIG. 7a is a transverse sectional view showing a positional relationship before impact between a passenger and a sidebody structure according to a second embodiment of the present invention.
Figure 7B:
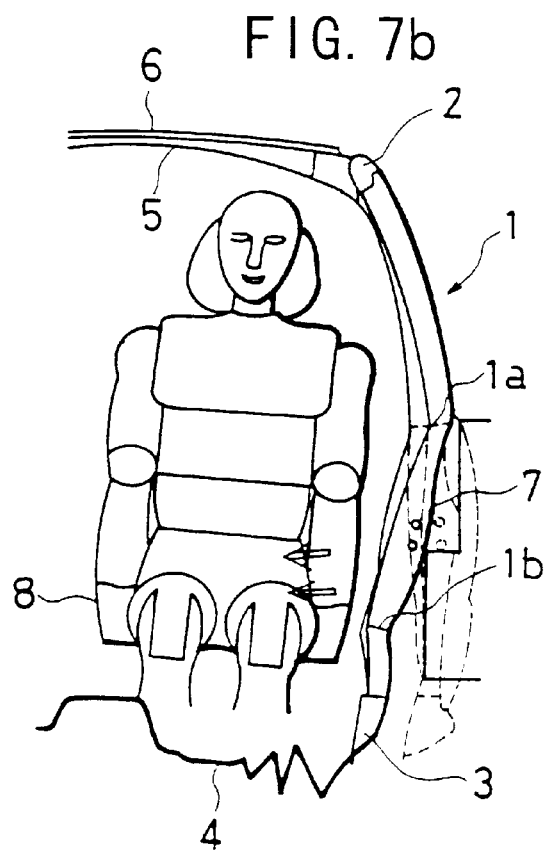
FIG. 7b is a transverse sectional view showing a positional relationship after impact between a passenger and a sidebody structure according to a second embodiment of the present invention.

Referring now to FIG. 7a and FIG. 7b, these drawings indicate a center pillar structure according to a second embodiment of the present invention. In this second embodiment, a first strength discontinuity portion 1a is formed approximately at the intermediate portion (the window shoulder position corresponding to the height position near the chest of the passenger sitting in the seat 8) of the center pillar 1. The portion higher than the first strength discontinuity portion is reinforced with reinforcing means not shown so as not to be bent or deformed in the event of a side impact. The connecting portion of the top end of the center pillar 1 with the side rail 2 and the roof brace 5 is constituted so as to have enough strength against the bending moment, and the roof brace 5 itself is also constituted with full strength.

Further, a second strength discontinuity portion 1b is provided at a position lower than the first strength discontinuity portion 1a and near the lower end of the center pillar 1 (the waist position of the passenger sitting on the seat 8 or slightly lower position than that). When a side impact is given to the sidebody of the vehicle, the center pillar 1 is bent at these bending points, the first and second strength discontinuity portions 1a and 1b, as shown in FIG. 7b.

As for the specific structure of these strength discontinuity portions 1a and 1b, for example, Japanese Utility Model Application Laid-open No. Jitsu-Kai-Hei 6-72787 discloses a center pillar structure, in which a discontinuity portion is provided in a pillar reinforcement member for reinforcing the center pillar or a bead portion is formed in the longitudinal direction of the vehicle in a pillar reinforcement member (or both the pillar reinforcement member and inner pillar). Any other structures, if they have more than one yieldable portion in the center pillar, may be employed. Portions of the center pillar other than these strength discontinuity portions are reinforced by miscellaneous reinforcing means.

The connecting portion of the center pillar 1 and the side sill 3 is constituted so that the side silt 3 is bent or deformed inwardly in the event of a side collision, as described in the first embodiment.

Thus, according to the second embodiment, when a side impact is applied to the sidebody structure of the vehicle, since the first strength discontinuity portion 1a is provided near the intermediate portion of the center pillar 1, as shown in FIG. 7b, the lower portion of the center pillar 1 rotates or pivots inwardly around the first strength discontinuity portion 1a (the pivot point) like a pendulum, and at the same time the seat 8 and the passenger sitting therein are swung inside like a pendulum, while the floor panel 4 is buckled inwardly. At this moment, since the upper portion of the center pillar 1 is resistant to the bending moment, some degree of space can be secured between the center pillar and passenger's chest and head. Further, the second strength discontinuity portion 1b provided near the lower end of the center pillar 1 is yieldable toward the inside, this making the collapse of the floor panel 4 easier.

In summary, according to the present invention, when a side collision is applied to the sidebody of the vehicle, since the center pillar is constituted so as to bend or pivot inwardly like a pendulum around the upper end thereof or the intermediate portion thereof, further since the passenger seat and the passenger sitting therein also swing toward the inside like a pendulum in conjunction with this movement of the center pillar, the passenger can protect his or her chest and head from being struck by the incoming center pillar. The sidebody structure according to the present invention is particularly effective for side collision countermeasures of a light weight small vehicle having a small space between the passenger and the sidebody.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A side body structure of a motor vehicle, comprising:
   a center pillar, wherein the center pillar includes a pivot point about which the center pillar moves inward with respect to the motor vehicle during a side impact, wherein the center pillar includes an inner pillar and an outer pillar;
   a side rail connected at a first end of the center pillar, wherein the side rail includes an inner rail and an outer rail, and wherein the inner rail includes at least one bead portion formed with a box shaped cross section so as to define the pivot point at a connection point of the center pillar and the side rail;
   a side sill connected at a second end of the center pillar at a yieldable connection, wherein the yieldable connection allows the side sill to deform inwardly with respect to the motor vehicle during a side impact; and
   a pillar reinforcement member applied on the center pillar between the pivot point and the yieldable connection, the pillar reinforcement member provided to strengthen the center pillar against bending such that the center pillar and the pillar reinforcement member swing inwardly with respect to the motor vehicle about the pivot point by deforming the side sill inwardly with respect to the motor vehicle at the yieldable connection when a side impact load is applied to the center pillar, wherein the pillar reinforcement member extends such that a gap is defined between the bead portion and the pillar reinforcement member when no side impact load is applied to the center pillar.

2. The side body structure according to claim 1, further comprising:
   a side sill reinforcement member located in the side sill for reinforcing the side sill; and
   wherein the side sill includes a strength discontinuity portion for providing the yieldable connection to the center pillar.

\* \* \* \* \*